(No Model.)

G. M. HELLER.
MANUFACTURE OF EYE BARS.

No. 424,783. Patented Apr. 1, 1890.

Witnesses:
Alex. Barkoff
Murray C. Boyer

Inventor:
George M. Heller
by his Attorneys
Howson & Howson

UNITED STATES PATENT OFFICE.

GEORGE M. HELLER, OF PHILADELPHIA, PENNSYLVANIA.

MANUFACTURE OF EYE-BARS.

SPECIFICATION forming part of Letters Patent No. 424,783, dated April 1, 1890.

Application filed August 17, 1888. Serial No. 283,012. (No model.)

*To all whom it may concern:*

Be it known that I, GEORGE M. HELLER, a citizen of the United States, and a resident of Philadelphia, Pennsylvania, have invented certain Improvements in the Manufacture of Eye-Bars and like Tension Members, of which the following is a specification.

The object of my invention is to form an eye-bar, clevis, or tension member—such as is used in bridges and similar structures—in such a manner as to improve and strengthen the member at the eye and make it more capable of resisting rupture, the manufacture of the eye-bar being at the same time cheapened and facilitated.

My invention may be applied to all tension members used in structures where the strain borne by the member is delivered on a pin.

Figure 1:
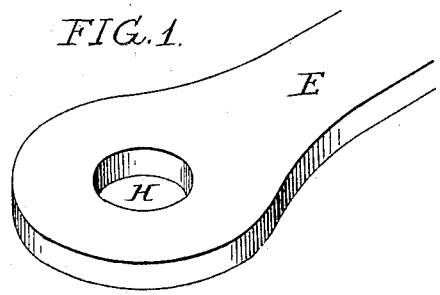
Figure 2:
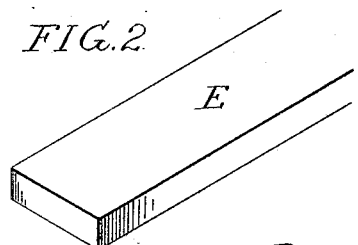
Figure 3:
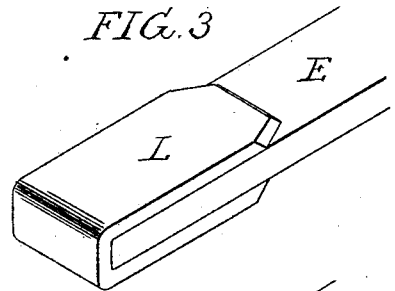
Figure 4:
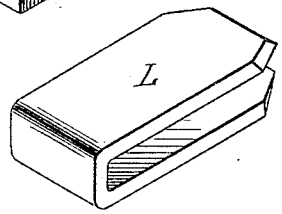
Figure 5:
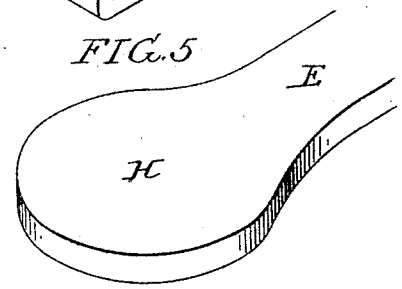
Figure 7:
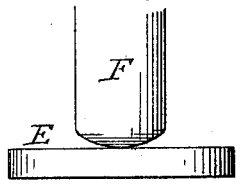
Figure 6:
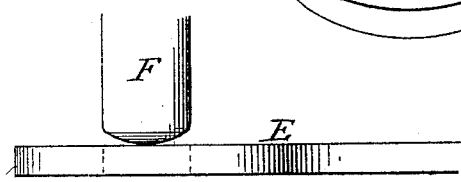
Figure 8:
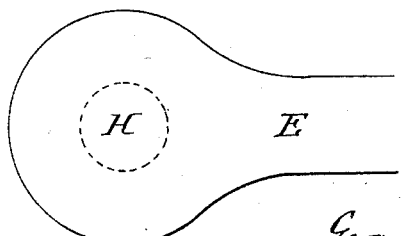

In the accompanying drawings, Figure 1 shows a finished eye-bar. Fig. 2 shows a plain blank bar. Fig. 3 shows a plain blank bar with a strengthening-loop placed on the end where the head of the eye-bar is to be formed. Fig. 4 shows the strengthening-loop detached from the bar with its ends properly scarfed. Fig. 5 shows a blank eye-bar previous to having the pin-hole formed, and Figs. 6, 7, and 8 are diagrams showing the manner of forming the pin-hole.

A plain bar E, Fig. 3, whose fiber is parallel throughout its length, has a loop L placed on the end of the bar where the head of the bar is to be formed, the fiber of the loop being parallel to the fiber of the bar and also continuous throughout its length and embracing both faces of the bar E. This disposition of the additional metal in the loop L required to form the head of the bar is chosen because of its providing a large welding surface between the bar and the loop, and it is made to embrace both faces of the bar, thereby making the metal to strengthen the head in a central and equalizing manner. The bar E, with the loop L placed upon it, as shown in Fig. 3, is then heated to a welding heat and forged in a properly-formed die, thus making a blank eye-bar, (shown in Fig. 5,) the pin-hole of which is formed as in Fig. 6, where the opening H for the pin P is made by forcing a plunger F, suitably formed, into the blank eye-bar while it is at a welding heat, thus allowing the plunger F in its advance into the bar to displace the metal of the bar at the pin-hole in a radial manner without severing the fibers, and thereby preserving the original metal of the bar in the neighborhood of the pin and causing the fibers of the finished bar to be arranged in the most proper manner for strength and security.

The method described above is applicable in cases where iron is the metal used. When the bar and loops are constructed of steel, I insert between the faces of the bar and loop a wrought-iron plate of proper shape to facilitate the welding of the steel together. In some cases wrought-iron loops may be applied directly to steel bar, or steel loops may be applied directly to an iron bar, without departing from my invention.

Having thus described my invention, I claim and desire to secure by Letters Patent—

1. The mode herein described of forming an eye-bar or like tension member, said mode consisting in placing a strengthening-loop upon the end of the bar and embracing both faces of the same, the fiber of the loop running parallel with the fiber of the bar and continuous throughout its length, then heating and welding said bar and loop, substantially as described.

2. The mode herein described of forming the pin-hole in an eye-bar or like tension member, said mode consisting in first producing a bar in which the pin-hole is to be formed, then forcing a plunger into the bar, whereby the metal is caused to flow radially outward and the pin-hole is formed without severing the fibers, substantially as described.

In testimony whereof I have signed my name to this specification in the presence of two subscribing witnesses.

GEORGE M. HELLER.

Witnesses:
EDWARD M. RILEY,
HENRY HOWSON.